(12) United States Patent
Hannuksela

(10) Patent No.: US 7,711,718 B2
(45) Date of Patent: May 4, 2010

(54) SYSTEM AND METHOD FOR USING MULTIPLE META BOXES IN THE ISO BASE MEDIA FILE FORMAT

(75) Inventor: Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 366 days.

(21) Appl. No.: 11/696,130

(22) Filed: Apr. 3, 2007

(65) Prior Publication Data

US 2008/0250047 A1    Oct. 9, 2008

(51) Int. Cl.
*G06F 17/00* (2006.01)
(52) U.S. Cl. .................. 707/695; 707/825; 707/954
(58) Field of Classification Search ............... 707/695, 707/688, 792, 803, 825, 954
See application file for complete search history.

(56) References Cited

U.S. PATENT DOCUMENTS

| | | | | |
|---|---|---|---|---|
| 5,664,182 A * | 9/1997 | Nierenberg et al. | ......... | 707/102 |
| 7,281,018 B1 * | 10/2007 | Begun et al. | ............. | 707/102 |
| 7,284,193 B1 * | 10/2007 | Lindhorst et al. | ............ | 715/234 |
| 7,287,018 B2 * | 10/2007 | Lennon | ......................... | 707/2 |
| 7,370,280 B2 * | 5/2008 | Ho et al. | ..................... | 715/762 |
| 7,451,156 B2 * | 11/2008 | Ornstein et al. | ............. | 707/101 |
| 2004/0186820 A1 * | 9/2004 | Izume et al. | .................... | 707/1 |
| 2006/0085465 A1 * | 4/2006 | Nori et al. | .................... | 707/101 |
| 2007/0100858 A1 * | 5/2007 | Milstead et al. | ............. | 707/101 |
| 2007/0100865 A1 * | 5/2007 | King et al. | ................... | 707/102 |

FOREIGN PATENT DOCUMENTS

WO    WO 9622573 A1 *  7/1996

OTHER PUBLICATIONS

Hannuksela, Miska, Multiple meta boxes in ISO base media file format. MPEG/M13335, ISO/IECJTC1/SC29/WG11, Montreaux, Switzerland, Apr. 3-7, 2006.

* cited by examiner

*Primary Examiner*—Shahid A Alam
(74) *Attorney, Agent, or Firm*—Foley & Lardner LLP

(57) ABSTRACT

A metabox container box which is capable of storing multiple meta boxes for use. The metabox container box can also include a box which indicates the relationship between each of the meta boxes stored in the metabox container box. Various embodiments of the present invention are also backward-compatible with earlier versions of the ISO base media file format.

24 Claims, 6 Drawing Sheets

SYSTEM AND METHOD FOR USING MULTIPLE META BOXES IN THE ISO BASE MEDIA FILE FORMAT

FIELD OF THE INVENTION

The present invention relates generally to the multimedia container file format. More particularly, the present invention relates to the use and processing of meta boxes in the multimedia container file format.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The multimedia container file format is an important element in the chain of multimedia content production, manipulation, transmission and consumption. In this context, the coding format (i.e., the elementary stream format) relates to the action of a specific coding algorithm that codes the content information into a bitstream. The container file format comprises mechanisms for organizing the generated bitstream in such way that it can be accessed for local decoding and playback, transferring as a file, or streaming, all utilizing a variety of storage and transport architectures. The container file format can also facilitate the interchanging and editing of the media, as well as the recording of received real-time streams to a file. As such, there are substantial differences between the coding format and the container file format.

The hierarchy of multimedia file formats is depicted generally at 1000 in FIG. 1. The elementary stream format 1100 represents an independent, single stream. Audio files such as .amr and .aac files are constructed according to the elementary stream format. The container file format 1200 is a format which may contain both audio and video streams in a single file. A example family of container file formats 1200 is based on the ISO base media file format. Just below the container file format 1200 in the hierarchy 1000 is the multiplexing format 1300. The multiplexing format 1300 is typically less flexible and more tightly packed than an audio/video (AV) file constructed according to the container file format 1200. Files constructed according to the multiplexing format 1300 are typically used for playback purposes only. An MPEG-2 program stream is an example of a stream constructed according to the multiplexing format 1300. The presentation language format 1400 is used for purposes such as layout, interactivity, the synchronization of AV and discrete media, etc. Synchronized multimedia integration language (SMIL) files and scalable video graphics (SVG) are constructed according to the presentation language format 1400. The presentation file format 1500 is characterized by having all parts of a presentation in the same file. Example of objects constructed according to this format are PowerPoint files and 3GP extended presentation profiles.

Available media file format standards include the ISO base media file format (ISO/IEC 14496-12), the MPEG-4 file format (ISO/IEC 14496-14, also known as the MP4 format), AVC file format (ISO/IEC 14496-15) and the 3GPP file format (3GPP TS 26.244, also known as the 3GP format). There is also a project in MPEG for development of the scalable video coding (SVC) file format, which will become an amendment to advanced video coding (AVC) file format. In a parallel effort, MPEG is defining a hint track format for file delivery over unidirectional transport (FLUTE) and asynchronous layered coding (ALC) sessions.

The Digital Video Broadcasting (DVB) organization is currently in the process of specifying the DVB file format. The primary purpose of defining the DVB file format is to ease content interoperability between implementations of DVB technologies, such as set-top boxes according to current (DVT-T, DVB-C, DVB-S) and future DVB standards, Internet Protocol (IP) television receivers, and mobile television receivers according to DVB-Handheld (DVB-H) and its future evolutions. The DVB file format will allow the exchange of recorded (read-only) media between devices from different manufacturers, the exchange of content using USB mass memories or similar read/write devices, and shared access to common disk storage on a home network, as well as other functionalities. The ISO base media file format is currently the strongest candidate as the basis for the development of the DVB file format. The ISO file format is the basis for the derivation of all the above-referenced file formats (excluding the ISO file format itself). These file formats (including the ISO file format itself) are referred to as the ISO family of file formats.

The basic building block in the ISO base media file format is called a box. Each box includes a header and a payload. The box header indicates the type of the box and the size of the box in terms of bytes. A box may enclose other boxes, and the ISO file format specifies which box types are allowed within a box of a certain type. Furthermore, some boxes are mandatorily present in each file, while other boxes are simply optional. Moreover, for some box types, there can be more than one box present in a file. Therefore, the ISO base media file format essentially specifies a hierarchical structure of boxes.

FIG. 2 shows a simplified file structure according to the ISO base media file format. According to the ISO family of file formats, a file 200 includes media data and metadata that are enclosed in separate boxes, the media data (mdat) box 210 and the movie (moov) box 220, respectively. For a file to be operable, both of these boxes must be present. The media data box contains video and audio frames. The media box may contain interleaved, time-ordered video and audio frames. The movie box 220 may contain one or more tracks, and each track resides in one track box 240. For the presentation of one media type, typically one track is selected.

It should be noted that the ISO base media file format does not limit a presentation to be contained in only one file. In fact, a presentation may be contained in several files. In this scenario, one file contains the metadata for the whole presentation. This file may also contain all of the media data, in which case the presentation is self-contained. The other files, if used, are not required to be formatted to the ISO base media file format. The other files are used to contain media data, and they may also contain unused media data or other information. The ISO base media file format is concerned with only the structure of the presentation file. The format of the media-data files is constrained by the ISO base media file format or its derivative formats only in that the media-data in the media files must be formatted as specified in the ISO base media file format or its derivative formats.

In addition to timed tracks, ISO files can contain any non-timed binary objects in a meta box. The meta box can reside at the top level of the file, within a movie box 220, and within a track box 240, but at most one meta box may occur at each of the file level, the movie level, or the track level. The meta box is required to contain a 'hdlr' box, indicating the structure or format of the 'meta' box contents. The meta box may contain any number of binary items that can be referred, and each one of the binary items can be associated with a file name.

As discussed above, the ISO base media file format structure limits the number of meta boxes to a maximum of one at each level of file hierarchy (file, movie, track) and the number of handlers per meta box is equal to one. However, an issue arises from these two limitations, namely how one represents in an ISO base media file that the same meta-data is being presented in two different, alternative, meta-data systems. There are several situations in which alternative meta-data representations could be useful in the same file. For example, a file may contain two descriptions of a multimedia presentation—one formatted according to the 3GPP scene description format, based on SMIL and specified in 3GPP TS 26.244 Rel-6, and one formatted according to SVG Tiny 1.2. Another example involves a file containing two descriptions of the included audio tracks—one formatted according to MPEG-7 metadata and another using ID3 tags. Still another example involves a file containing a recorded television broadcast with associated electronic service guide (ESG) metadata in two formats, where the first format is the common subset of ESG metadata specified in the DVB file format (under preparation) and the second format is the full-blown ESG format used in the broadcasting service, such as TV-Anytime or DVB-H ESG.

SUMMARY OF THE INVENTION

Various embodiments of the present invention provide for a metabox container box, which is capable of storing multiple meta boxes for use. The metabox container box can also include a metabox relation box, which indicates the relationship between each of the meta boxes stored in the metabox container box. Additionally, various other features can be indicated via the metabox container box. Various embodiments of the present invention are also backward-compatible with earlier versions of the ISO base media file format.

In various embodiments of the present invention, a device is used for generating a file, the file including a first description and a second description for processing the file. In this file, the first description is indicated as being the default description for processing the file according to a first file format, and the second description is encapsulated to a structure that is specified to be ignored according to the first file format. The first and second descriptions can be formatted differently, and the second description can be used for processing the file if it is not possible or feasible to use the first description or the second description is richer compared to the first description in certain embodiments. The contents of the file can comprise, for example, a single real-time media stream or a composition of real-time media streams.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
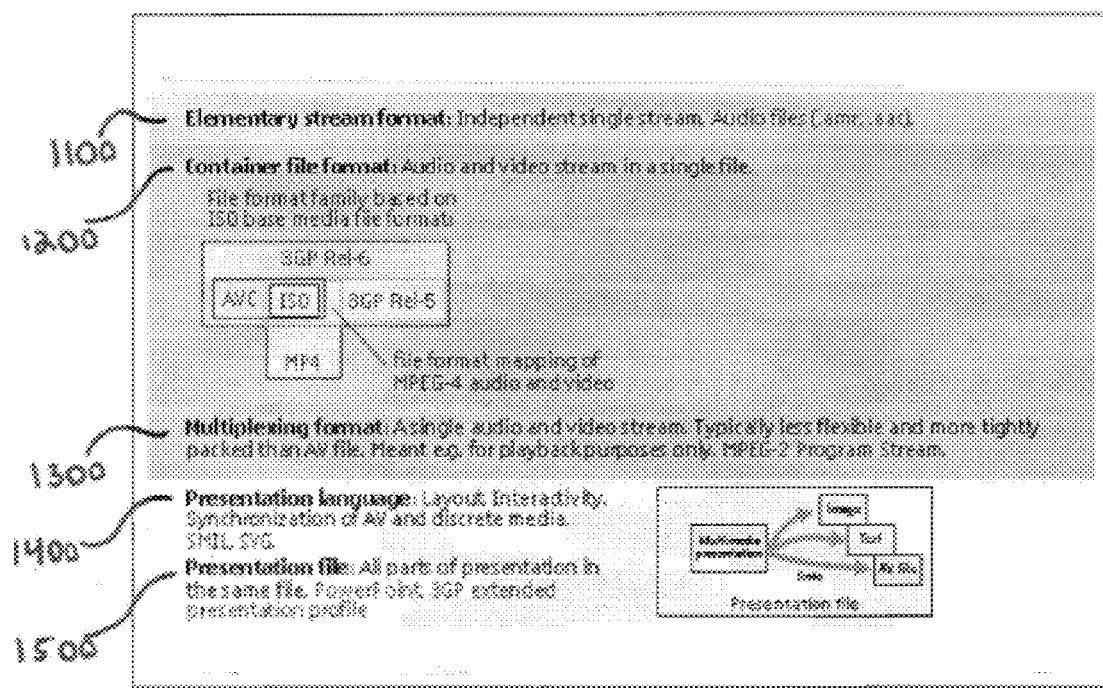
FIG. 1 is a depiction of the hierarchy of multimedia file formats.
Figure 2:
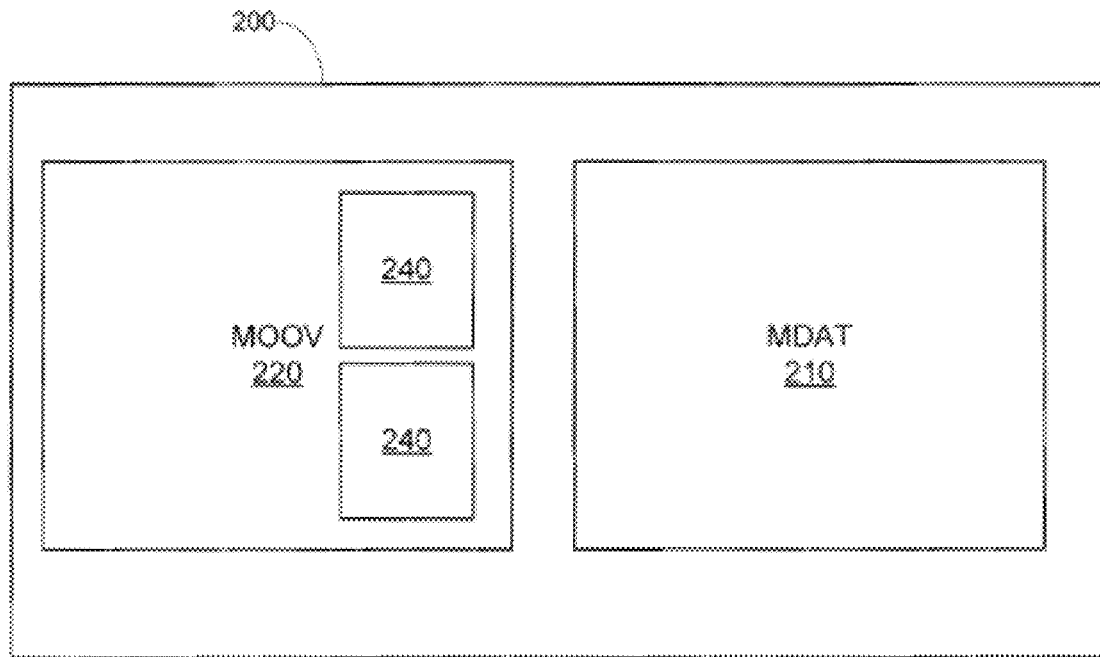
FIG. 2 is a representation of a simplified structure of an ISO file.
Figure 3:
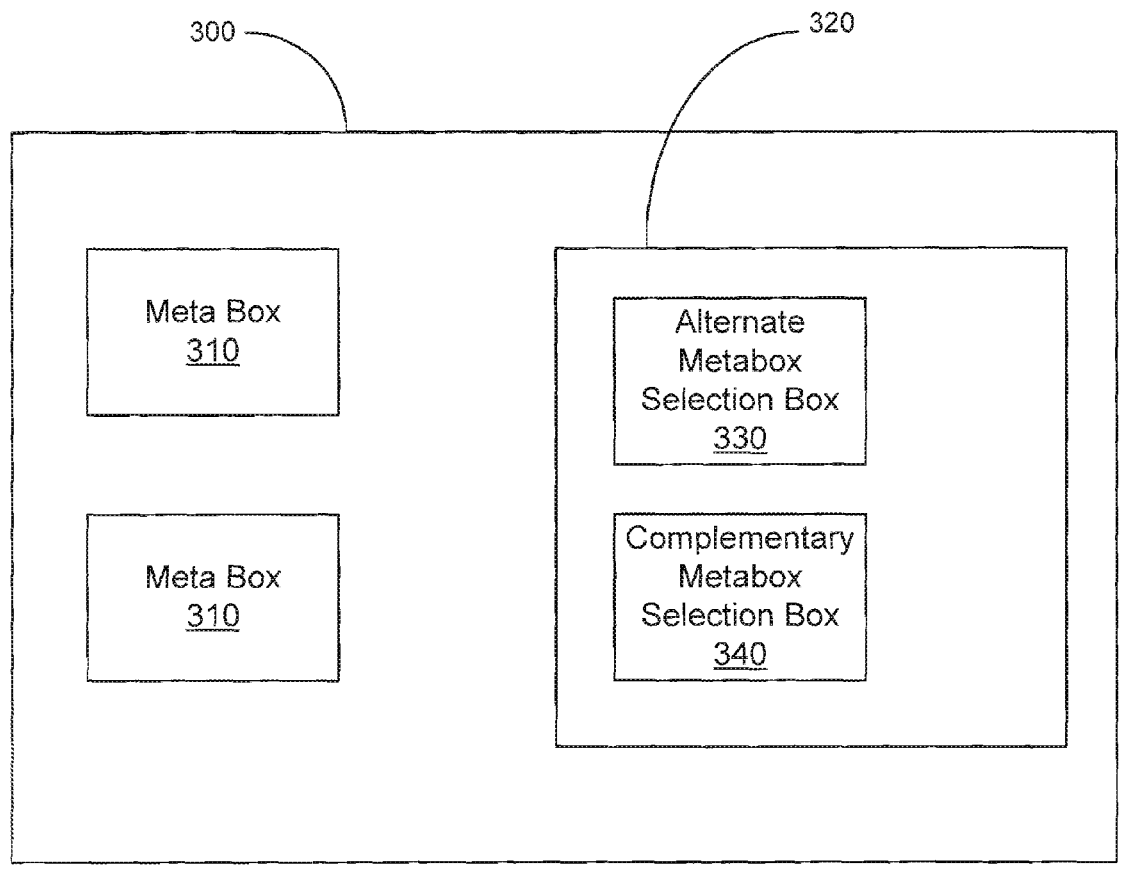
FIG. 3 is a representation of a metabox container box constructed according to various embodiments of the present invention.

Various embodiments of the present invention provide for a metabox container box, which is capable of storing multiple meta boxes for use. FIG. 3 is a representation of a metabox container box 300 constructed according to various embodiments of the present invention. As shown in FIG. 3, the metabox container box 300 can include a plurality of meta boxes 310. The metabox container box 300 of FIG. 3 also includes a metabox relation box 320. The metabox relation box 320 indicates the relationship between each of the meta boxes 310 stored within the metabox container box 300. Additionally, various other features can be indicated via the metabox container box. Various embodiments of the present invention are also backward-compatible with earlier versions of the ISO base media file format. In various embodiments, the metabox container box 300 can be carried at the file, movie or track level. The use of multiple meta boxes 310 in the metabox container box 300 is desirable when a single handler is not capable of processing, or cannot efficiently process, all of the metadata to be included in the container. Meta boxes 310 in a metabox container box 300 can be alternative or complementary compared to each other or the meta box present in the same container box as a metabox container box 300.

Particular descriptions and syntax for implementing various embodiments of the present invention can be found in Document MPEG/M13335, entitled "Multiple Meta Boxes in ISO Base media File Format," of the International Organisation for Standardisation (ISO)/IEC JTC1/SC29/WG11 (2006), the contents of which are incorporated herein by reference. The following is example syntax laying out the structure of a metabox container box 300 according to one embodiment of the present invention.

```
aligned(8) class MetaboxContainerBox
    extends FullBox('meco', version=0, 0) {
    unsigned int(16) count;
    for (i=1; i <= count; i++) {
        MetaBox        meta_info[i];
    }
    MetaBoxRelationBox meta_relation; // optional
}
```

As discussed above, the metabox relation box 320 indicates the relationship between meta boxes 310 in the same metabox container box 300. If a meta box is present in the same container box as a metabox container box 300, then it is considered as the meta box 310 with index 0 (meta info[0]) and also referred to as the default meta box.

The following is example syntax laying out the structure of a metabox relation box 320 according to an embodiment of the present invention.

```
aligned(8) class MetaboxRelationBox
    extends FullBox('mere', version=0, 0) {
    AlternateMetaboxSelectionBox alternate_metaboxes; // optional
    ComplementaryMetaboxSelectionBox alternate_metaboxes; //
    optional
    Box other_boxes[ ]; // optional
}
```

If there are multiple meta-data representations in the same file, it is also possible to indicate a number of features. For example, if a parser can interpret more than one of the provided representations or descriptions, it is possible to indicate which of the representations should be chosen by the parser for processing. Additionally, it is also determinable whether the representations or descriptions are overlapping entirely (i.e. providing exactly the same information), if one representation or description is a superset of another, if the data of the descriptions or representations intersects, but one description or representation is not a superset of another, or if the descriptions or representations are purely complementary in nature.

The alternate metabox selection box, represented at 330 in FIG. 3, indicates a subset of the meta boxes 310 and the default meta box whose processing according to their handlers results in a similar outcome. Only one of the indicated meta boxes 310 and the default meta box should be processed according to its handler at one time. The meta boxes 310 and the default meta box are listed in descending preference order, i.e. the first such meta box in the alternate metabox selection box 330 whose handler is supported should be processed. In this sense, the first such meta box is the "preferred" meta box or description, and subsequent meta boxes ignored and are encapsulated as such. In certain embodiments, subsequent meta boxes 310 are used for processing in the event that a higher-priority meta box is unusable or it is not feasible to be used. The following is example syntax laying out the structure of an alternate metabox selection box 330 according to an embodiment of the present invention.

```
aligned(8) class AlternateMetaboxSelectionBox
    extends FullBox('ames', version=0, 0) {
    unsigned int(16)    metabox_count;
    for (j=1; j <= metabox_count; j++)
        unsigned int(16)    metabox_index;
}
```

The following is an example of a situation where an alternate metabox selection box 330 is useful. In this example, a metabox container box 300 may reside in the file level and contain two meta boxes 310: a first metabox whose handler is '3gsd' (3GPP scene description, based on SMIL, specified in 3GPP TS 26.244 Rel-6) and a second metabox whose handler is 'svgt' (for SVG Tiny 1.2). Processing of both of the meta boxes 310 would result in a similar multimedia presentation, but the 'svgt' Meta Box gives a richer experience due to a greater number of graphics components in the presentation. Therefore, the meta boxes 310 are listed in an alternate metabox selection box 330, with the index of the 'svgt' Meta Box being listed first, followed by the index of the '3gsd' meta box.

The complementary metabox selection box 340 indicates a set of meta boxes 310 from which any one can be processed individually but which contains partially semantically identical data (which may, however, be indicated using different syntax). More than one of the indicated meta boxes 310 and the default meta box may be processed. The meta boxes are listed in arbitrary order. It should be noted that.

The following is example syntax laying out the structure of an complementary metabox selection box 340 according to an embodiment of the present invention.

```
aligned(8) class ComplementaryMetaboxSelectionBox
    extends FullBox('cmes', version=0, 0) {
    unsigned int(16)    metabox_count;
    for (j=1; j <= metabox_count; j++)
        unsigned int(16)    metabox_index;
}
```

The following is an example of a situation where a complementary metabox selection box 340 is useful. In this example, the metabox container box may reside in the movie level and contain two meta boxes: a first whose handler is 'mp7t' (MPEG-7 metadata) and a second whose handler is 'id32' (ID3 version 2 Box, defined by the MP4 registration authority). While a portion of the metadata included in the meta boxes 310 is semantically identical, the 'mp7t' meta box contains a richer set of data. Therefore, the boxes are listed in a complementary metabox selection box 340.

Communication devices incorporating and implementing various embodiments of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 4:
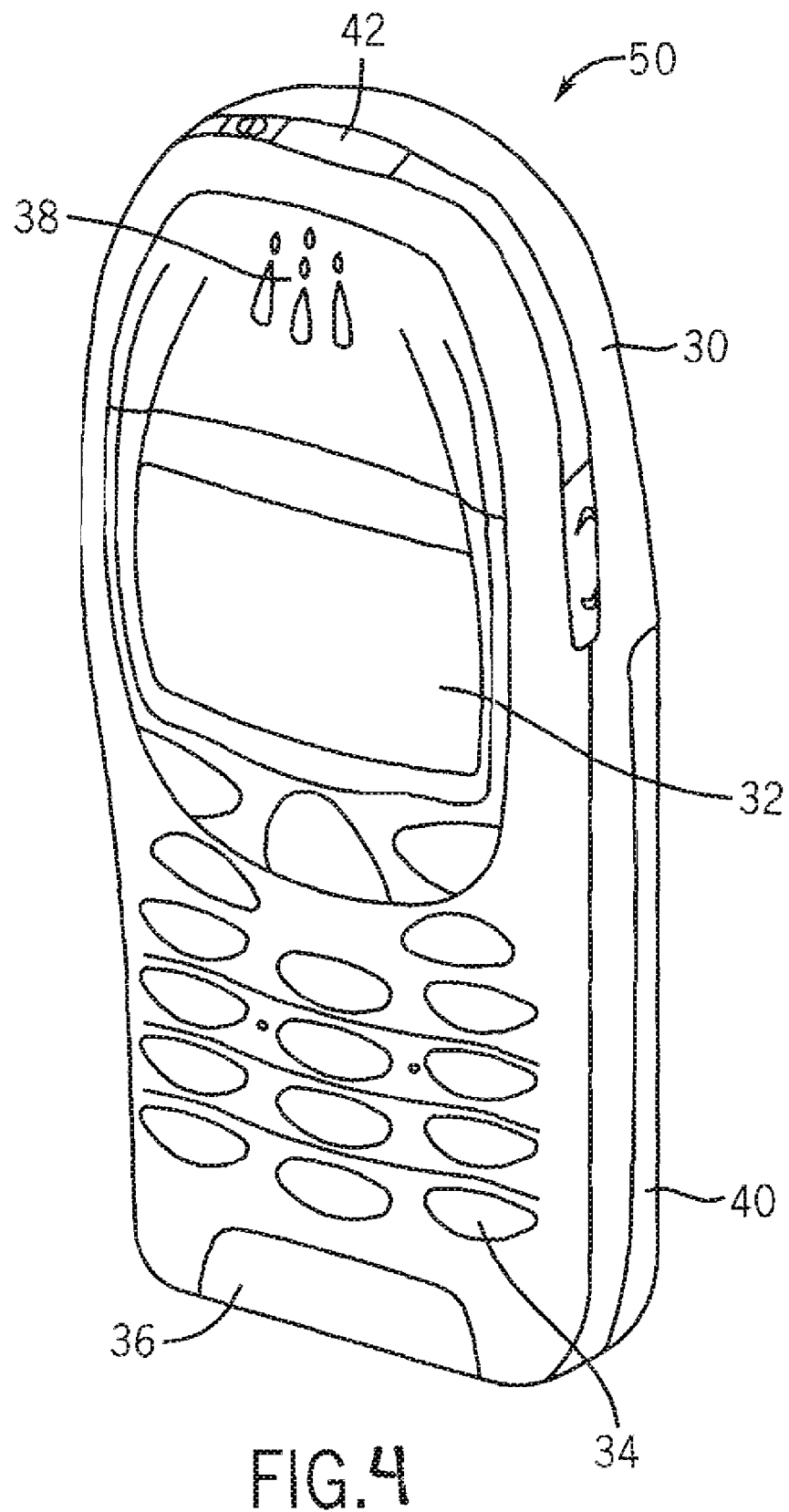
FIG. 4 is a perspective view of an electronic device that can be used in conjunction with the implementation of various embodiments of the present invention.
Figure 5:
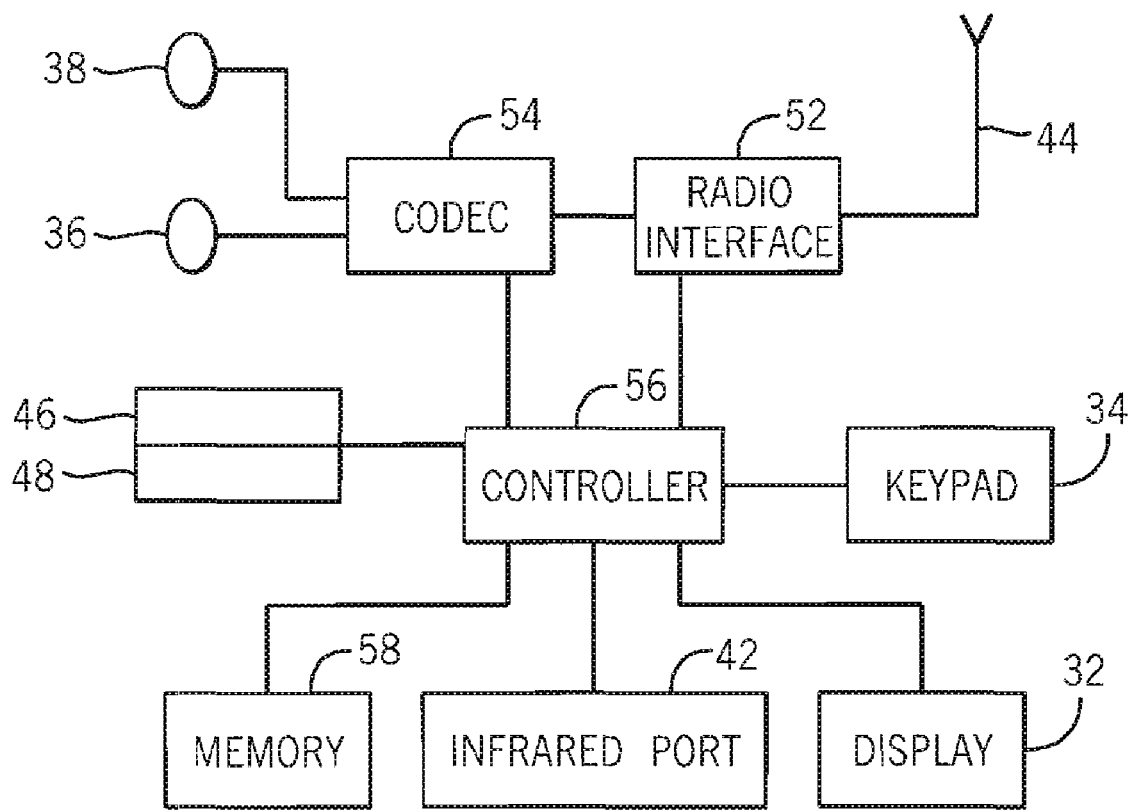
FIG. 5 is a schematic representation of the circuitry which may be included in the electronic device of FIG. 4.

FIGS. 4 and 5 show one representative electronic device 50 within which the present invention may be implemented. It should be understood, however, that the present invention is not intended to be limited to one particular type of device. The electronic device 50 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 6:
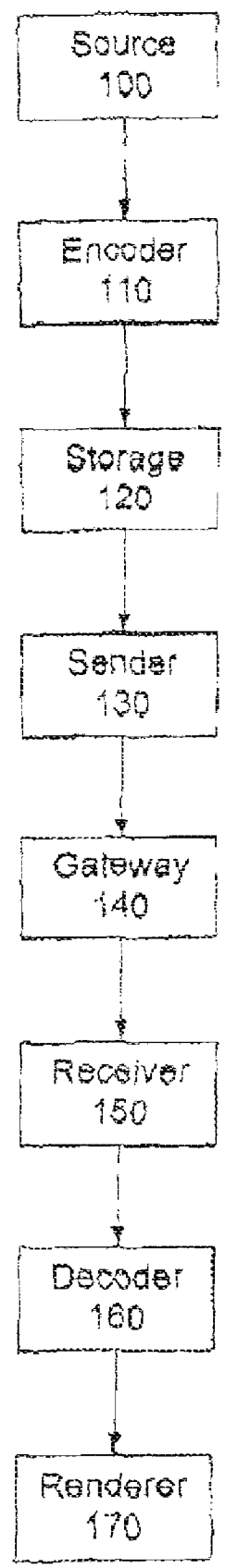
FIG. 6 is a representation of a generic multimedia communications system for use with the present invention.

FIG. 6 shows a generic multimedia communications system for use with the present invention. It should also be noted that any element in such a communication system that is involved in the parsing, generating or other processing of container files may utilize various embodiments of the present invention. A data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also receive synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bitstream. The codec media bitstream is typically processed further by a decoder 160, whose output is one or more uncompressed media streams. It should be noted that the bitstream to be decoded can be received from a remote device located within virtually any type of network. Additionally, the bitstream can be received from local hardware or software. Finally, a renderer 170 may reproduce the uncompressed media streams with a loudspeaker or a display, for example. The receiver 150, decoder 160, and renderer 170 may reside in the same physical device or they may be included in separate devices.

The various embodiments of the present invention described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A method comprising:
   generating a first metadata stored in a first meta box of a container file stored in a memory and a second metadata stored in a second meta box of the container file;
   generating a metabox container box containing the first meta box and the second meta box,
   wherein the first metadata is indicated as a default description for the processing of the container file according to a first file format, and wherein the second metadata is encapsulated to a structure that is specified to be ignored according to the first file format; and
   including a metabox relation box within the metabox container box, the metabox relation box identifying relationships between the first meta box and the second meta box.

2. The method of claim 1, wherein the first metadata is formatted differently than the second metadata.

3. The method of claim 1, wherein the second metadata is indicated to be used for processing the container file if it is not feasible to use the first metadata for processing the container file.

4. The method of claim 1, wherein a subset of the container file contents are configured for processing in accordance with the first metadata.

5. The method of claim 4, wherein the subset comprises a composition of real-time media streams included in the container file.

6. The method of claim 4, wherein the subset comprises a real-time media stream included in the container file.

7. The method of claim 1, further comprising including an alternate metabox selection box within the metabox container box, the alternate metabox selection box indicating that the processing of each of the plurality of meta boxes results in similar outcomes.

8. The method of claim 7, wherein the plurality of meta boxes are identified within the alternate metabox selection box, and wherein the first meta box that is identified within the alternate metabox selection box should be processed.

9. The method of claim 1, further comprising including an complementary metabox selection box within the metabox container box, the complementary metabox selection box indicating that the processing of each of the plurality of metaboxes contains partially semantically identical data.

10. A computer-readable storage medium having a computer program stored thereon, the computer program comprising instructions operable to cause a processor to perform the processes of claim 1.

11. An apparatus, comprising:
a processor; and
a memory unit communicatively connected to the processor and including:
computer code for generating a container file, the container file including a first metadata stored in a first meta box of the container file and a second metadata stored in a second meta box of the container file;
computer code for generating a metabox container box containing the first meta box and the second meta box, wherein the first metadata is indicated as a default description for the processing of the container file according to a first file format, and wherein the second metadata is encapsulated to a structure that is specified to be ignored according to the first file format; and
computer code for including a metabox relation box within the metabox container box, the metabox relation box identifying relationships between the first meta box and the second meta box.

12. The apparatus of claim 11, wherein the first metadata is formatted differently than the second metadata.

13. The apparatus of claim 11, wherein the second metadata is indicated to be used for processing the container file if it is not feasible to use the first metadata for processing the container file.

14. The apparatus of claim 11, wherein a subset of the container file contents are configured for processing in accordance with the first metadata.

15. The apparatus of claim 14, wherein the subset comprises a composition of real-time media streams included in the container file.

16. The apparatus of claim 14, wherein the subset comprises a real-time media stream included in the container file.

17. The apparatus of claim 11, wherein the container file further includes an alternate metabox selection box within the metabox container box, the alternate metabox selection box indicating that the processing of each of the plurality of meta boxes results in similar outcomes.

18. The apparatus of claim 17, wherein the plurality of meta boxes are identified within the alternate metabox selection box, and wherein the first meta box that is identified within the alternate metabox selection box should be processed.

19. The apparatus of claim 11, wherein the container file further includes an complementary metabox selection box within the metabox container box, the complementary metabox selection box indicating that the processing of each of the plurality of metaboxes contains partially semantically identical data.

20. An apparatus, comprising:
a processor; and
a memory unit communicatively connected to the processor and including a multimedia container file comprising:
a first metadata stored in a first meta box of the container file stored in a memory and a second metadata stored in a second meta box of the container file;
a metabox container box containing the first meta box and the second meta box; and
a metabox relation box within the metabox container box, the metabox relation box identifying relationships between the first meta box and the second meta box,
wherein the first metadata is indicated as a default description for the processing of the container file according to a first file format, and wherein the second metadata is encapsulated to a structure that is specified to be ignored according to the first file format.

21. The apparatus of claim 20, wherein the structure that is specified to be ignored according to the first file format is a metabox container box.

22. The apparatus of claim 20, wherein the multimedia container file further comprises an alternate metabox selection box included within the metabox container box, the alternate metabox selection box indicating that the processing of each of the plurality of meta boxes results in similar outcomes.

23. The apparatus of claim 22, wherein the plurality of meta boxes are identified within the alternate metabox selection box, and wherein the first meta box that is identified within the alternate metabox selection box should be processed.

24. The apparatus of claim 20, wherein the multimedia container file further comprises an complementary metabox selection box included within the metabox container box, the complementary metabox selection box indicating that the processing of each of the plurality of meta boxes contains partially semantically identical data.

* * * * *